United States Patent
Baier et al.

(10) Patent No.: US 6,779,652 B2
(45) Date of Patent: Aug. 24, 2004

(54) CHAIN LINK, ESPECIALLY OF A CURVED-NEGOTIATING CONVEYOR CHAIN

(75) Inventors: Wolfram Baier, Ostfildern (DE); Guido Hettwer, Stuttgart (DE); Peter Rothfuss, Ditzingen (DE); Olaf Klemd, Markgroeningen (DE); Wolfgang Janzen, Wilnsdorf (DE); Klaus Nendel, Oederan (DE); Peter Meynerts, Gruena (DE)

(73) Assignees: Robert Bosch GmbH, Stuttgart (DE); Flexon Systemplast GmbH, Dohna (DE)

( * ) Notice: Subject to any disclaimer, the term of this patent is extended or adjusted under 35 U.S.C. 154(b) by 0 days.

(21) Appl. No.: 10/344,874
(22) PCT Filed: Aug. 9, 2001
(86) PCT No.: PCT/DE01/03053
§ 371 (c)(1),
(2), (4) Date: Jun. 12, 2003
(87) PCT Pub. No.: WO02/14189
PCT Pub. Date: Feb. 21, 2002

(65) Prior Publication Data
US 2004/0050672 A1 Mar. 18, 2004

(30) Foreign Application Priority Data
Aug. 16, 2000 (DE) .......................... 100 40 081

(51) Int. Cl.[7] .............................................. B65G 15/02
(52) U.S. Cl. .......................... 198/831; 198/852; 198/853
(58) Field of Search .................................. 198/831, 850, 198/851, 852, 853

(56) References Cited

U.S. PATENT DOCUMENTS

| | | | |
|---|---|---|---|
| 2,256,005 A | 9/1941 | Wood ........................ 104/172.5 |
| 3,730,331 A | 5/1973 | Goldberg ................. 198/850 X |
| 3,944,059 A | * 3/1976 | Garvey ........................ 198/850 |
| 4,524,865 A | 6/1985 | Von Hofen ................. 198/852 |
| 4,597,492 A | 7/1986 | Lachonius ................... 198/852 |
| 5,127,515 A | * 7/1992 | Damkjaer .................... 198/831 |
| 5,402,880 A | 4/1995 | Murphy ....................... 198/852 |
| 5,489,020 A | * 2/1996 | Clopton ....................... 198/851 |
| 5,586,644 A | * 12/1996 | Coen et al. ................. 198/853 |

FOREIGN PATENT DOCUMENTS

| | | |
|---|---|---|
| DE | 32 35 224 A1 | 4/1983 |
| WO | 99/527798 | 10/1999 |

* cited by examiner

*Primary Examiner*—James R. Bidwell
(74) *Attorney, Agent, or Firm*—Michael J. Striker

(57) ABSTRACT

A chain link (10) of a curved conveyor chain has been proposed, which has a carrying device (12) for transport material. A head part (24) disposed under the carrying device (12) has a lateral bore (40) for a pin (48) of a first adjacent chain link (10). The head part (24) is adjoined by a fork-shaped section (26) with two legs (44), which encompass the head part (24) of a second adjacent chain link (10). The legs (44) and contain lateral bores (46). A pin (48) is also provided, which is contained in the lateral bores (46) of the legs (44) and in the head part (24) of the second adjacent chain link (10). Projections (52) protrude from the legs (44) and are designed to be guided in a guide profile and driven by means of a driving wheel. The object of the invention is to produce a chain link (10), which permits a favorable introduction of force. To this end, the protrusions (52) are disposed between the lateral bores (46) of the legs (44) and the at least one lateral bore (40) of the head part (24), viewed in the transport direction (33).

11 Claims, 1 Drawing Sheet

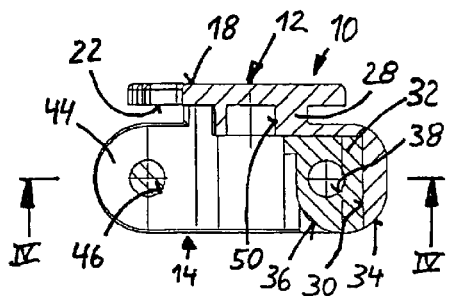
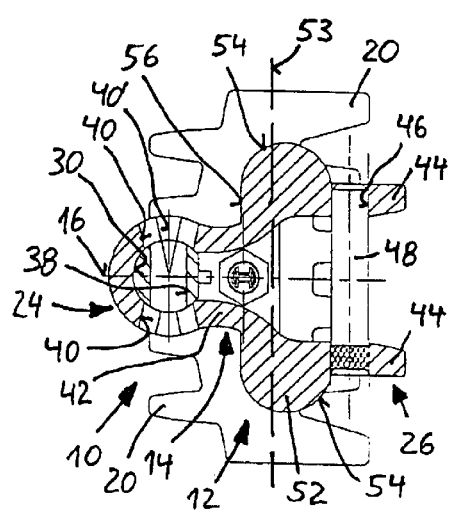
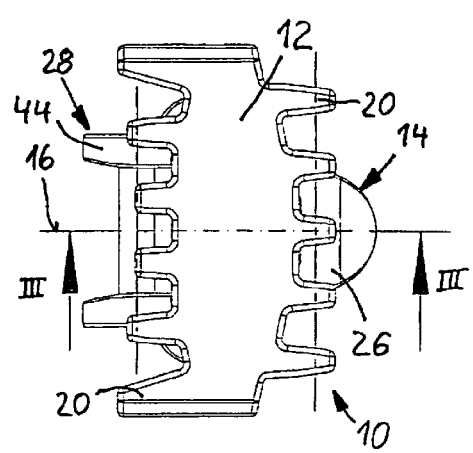
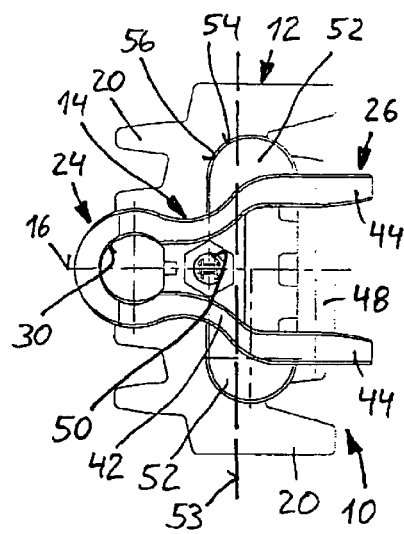
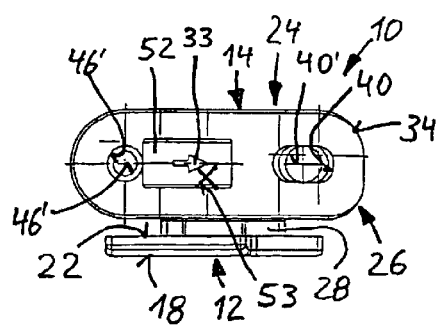

CHAIN LINK, ESPECIALLY OF A CURVED-NEGOTIATING CONVEYOR CHAIN

PRIOR ART

The invention is based on a chain link, in particular of a curved conveyor chain, according to the preamble to claim 1.

A chain link of this kind, for example known from DE 32 35 224 A1, has a carrying device for holding material to be transported, such as work pieces or work piece supports. The carrying device has a head part in which at least one lateral bore is provided for pivotably supporting a pin of a first chain link adjacent to the head part. The head part is adjoined by a fork-shaped section, which is likewise disposed on the carrying device and has two legs that encompass the head part of a second chain link adjacent to the fork-shaped section. The legs are provided with lateral bores that are aligned with each other. The chain link has a pin, which is contained in the lateral bores of the legs and the head part of the second adjacent chain link. Projections protrude laterally from the legs in order to permit the chain link to be guided, particularly in the return side of a guide profile, and be driven by a driving wheel. The lateral bores of the legs also extend through the projections.

Since the pins extend over the entire external width of the projections, the conveyor chain is relatively heavy.

Since the projections are disposed around the pin, they have a reduced cross section due to the presence of the lateral bores. As a result, there is an increased stress concentration at this point. This reduces the drive forces that can be transmitted.

Since the pin is far away from a horizontal axis extending lateral to the longitudinal central axis through the center of gravity, when the conveyor chain is guided in the return side, a moment is produced, which causes the chain links to tilt around this center-of-gravity axis. As a result, an increased surface pressure is produced at the edges of the projections, which causes wear on these projections.

In driving wheels, which deflect the conveyor chain in one plane, the offset in relation to the above-mentioned horizontal axis likewise produces a moment, which can cause the conveyor chain to operate erratically. Particularly with small driving wheels that have only a few teeth, this also intensifies the so-called polygon effect. The polygon effect occurs in every conveyor chain. The greater the pitch and the smaller the number of teeth on the chain wheels, the more intense the polygon effect is.

In a conveyor chain composed of chain links according to DE 32 35 224 A1, the cylindrical design of the projections particularly has the advantage that in the driving wheels, which drive the conveyor chain in the plane, it is only possible for there to be point contact or linear contact with their gearing, thus setting the stage for a possible overloading of the plastic in the contact zone and for the occurrence of significantly greater wear.

WO 99/52798 has disclosed a chain link in which the projections on the legs are embodied underneath the lateral bores. When a driving wheel introduces a force, this also produces a moment, which can result in erratic operation.

ADVANTAGES OF THE INVENTION

The chain link according to the invention, in particular of a curved conveyor chain, with the characterizing features of claim 1, has the advantage over the prior art that no lateral tilting moment occurs since the projections are situated between the lateral bores of the legs and the at least one lateral bore of the head part. Since no bore therefore extends through the projections, there is also no cross sectional reduction and therefore no stress concentration, which makes it permits transmission of very powerful forces despite the low weight. Since the projections are situated as close as possible to the horizontal axis through the center of gravity, the moments occurring and consequently the wear, are reduced and the force and lever ratios are optimized.

In one advantageous modification, a receptacle for a threaded element such as a nut or hexagon bolt is provided on the underside of the carrying device, between the pin and the head part. This makes it easier to mount client-specific attachments onto the carrying devices.

Other advantages and advantageous modifications of the chain link according to the invention ensue from the dependent claims and the drawings.

DRAWINGS

An exemplary embodiment of the invention is shown in the drawings and will be explained in detail below.

FIG. 1 shows a top view of the chain link,

FIG. 2 shows a bottom few according to FIG. 1,

FIG. 3 shows a sectional side view from the left according to the cutting lines III—III in FIG. 1, FIG. 4 shows a sectional bottom few according to the cutting lines IV—IV in FIG. 3, and FIG. 5 shows a side view from the right according to FIG. 1.

DESCRIPTION OF THE EXEMPLARY MONUMENT

FIG. 1 shows a chain link 10 of a curved conveyor chain. The chain link 10 has essentially one carrying device 12 and one base body 14 disposed under the carrying device 12, which extends along the longitudinal central axis depicted with a dot-and-dash line 16.

The carrying device 12 serves as a receiver of transport material, such as work pieces or work piece supports. To this end, the carrying device 12—as shown—can be provided with a flat top side 18 or with special receptacles, coatings, or magnets for the transport material. Outer regions of the carrying device 12 are provided with fingers 20. The fingers 20 are arranged so that they engage with one another when a number of chain links 10 are combined to form a conveyor chain. On the one hand, this produces the greatest possible area for supporting the transport material. On the other hand, there is no place for body parts, clothing items, larger chips, work pieces, or the like to get caught.

As shown more clearly in FIG. 2, the base body 14 situated on the underside 22 of the carrying device 12 is essentially comprised of a head part 24, which transitions into an adjoining fork-shaped section 26. The head part 24 and the fork-shaped section 26 are formed onto the carrying device 12 by means of an intermediate section 28 with a smaller cross sectional area.

The head part 24 has a bore 30, which extends from the underside of the chain link 10, essentially perpendicular to the carrying device 12 and to the longitudinal central axis 16. Preferably, however, the bore 30 does not extend to the top side 18 of the carrying device 12.

The sectional depiction according to FIG. 3 shows that a lug 32 is contained in the bore 30 off the head part 24. The lug 32 is contained in the bore 30 in a rotating fashion. The region 34 of the head part 24 on the underside of the chain link 10, which region 34 is at the front in the usual transport direction 33 (FIG. 5), and the region 36 of the lug 32 at the back in the usual transport direction 33 are rounded. This gives the lug 32 and the head part 24, which can be used for driving the conveyor chain by means of a driving wheel, not shown, a form that is optimized for this purpose.

As shown by the sectional depiction in FIG. 4, a lateral bore 38 is provided in the lug 32. Two lateral bores 40, which extend laterally to the longitudinal central axis 16, feed into the bore 30 of the head part 24. The lateral bores 40 widen toward the outside of the head part 24; they extend approximately parallel to the carrying device 12 and their longitudinal axes 40' are aligned with each other. The lateral bore 38 of the lug 32 contains a pin, not shown, of a first chain link 10—likewise not shown—adjacent to the head part 24. The pin extends through the lateral bores 40 of the head part 24.

Since the lug 32 is contained in a rotating fashion in the bore 30 of the head part 24, the pin is pivotably support. The conveyor chain comprised of a number of chain links 10 can consequently be deflected by means of a driving wheel from a working side into a return side and vice versa. In addition, a laterally engaging drive wheel can deflect the conveyor chain so that the top sides 18 of the carrying devices 12 of the chain links 10 are moved in one plane. These two possible types of deflection of the chain links 10 are also referred to as a three-dimensional or curved conveyor chain.

There are also possible modifications in which the lug 32 and bore 30 in the head part 24 can be eliminated. Then the only requirement would be a modified lateral bore 40, whose narrowest point is in the center of the head part 24 and which likewise widens toward the outside.

It is also possible for the lateral bore 40 to have a uniform diameter. But in such a case, it would not be possible for there to be a deflection of the conveyor chain in which the top sides 18 of the carrying devices 12 remained in one plane; it would no longer be a curved conveyor chain as in a conveyor chain comprised of the chain links 10 shown in the figures.

The fork-shaped section 26, which adjoins the head part 24, transitions into a V-shaped section 42, which is adjoined by two legs 44 that extend essentially parallel to each other. The two legs 44 encompass the head part, not shown, of a second adjacent chain link 10, likewise not shown. Once again, lateral bores 46 that are aligned with each other are provided in the legs 44.

As a further element of the chain link 10 and of a conveyor chain, a pin 48 is once again provided, which is contained in the lateral bores 46 of the legs 44 and in the head part 24 of the second adjacent chain link 10. In the current exemplary embodiment, the pin 48 is supported in a rotating fashion in the lateral bore 38 of the lug 32 and is press-fitted into the lateral bores 46 of the legs 44. To this end, the pin 48 has a knurled section on its outer circumference in the vicinity of at least one lateral bore 46 and is also press-fitted into the lateral bore 46.

As also shown in FIG. 4, a receptacle 50 for a threaded element, not shown, is provided on the underside 22 of the carrying device 12, between the pin 48 and the head part 24. In the current exemplary embodiment, the receptacle 50 is designed for a nut, preferably a hex nut. However, it is also possible for the receptacle 50 to contain a hexagon bolt, for example. In this instance, material still remains between the receptacle 50 and the top 18 or side of the carrying device 12 against which the transport material rests. The only drilling required is to provide a suitable hole for a threaded bolt. To this end, a countersink can also be provided as a drilling aid at the bottom of the receptacle 50. This makes it easier to mount client-specific attachments onto the carrying device 12.

Wing-like projections 52 protrude laterally from the legs 44. In particular, the projections 52 are used for guiding the chain link 10 in the return side of a guide profile, not shown, and for being driven by means of a driving wheel that is also not shown. The projections 52 are disposed on the outsides of the legs 44, between the lateral bores 46 of the legs 44 and the lateral bores 40 of the head part 24, viewed in the transport direction 33 of a conveyor chain comprised of a number of chain links 10. The projections 52 are situated as close as possible to the axis 53 indicated with a dashed line, which extends perpendicular to the longitudinal central axis 16, parallel to the lateral bores 46 of the legs 44, and through the center of gravity of the chain link 10.

It is clear from FIG. 5 that the projections 52 are disposed at the same height as the longitudinal axes 46' and 40' of the lateral bores 46 of the legs 44 and the at least one lateral bore 40 or—as depicted—the two lateral bores 40 of the head part 24. The projections 52 directly adjoin the lateral bores 46 of the legs 44. The projections 52 extend along the longitudinal central axis 16 with a span dimensioned so that as little contact as possible occurs with the legs of the first adjacent chain link 10 or at most, this occurs in a minimal turning radius in the type of deflection in which the carrying devices 12 are moved in one plane. In the current exemplary embodiment, the span along the longitudinal central axis 16 or transport direction 33 is designed in such a way that from the edge region of the lateral bore 46 of the leg 44 situated closest to the lateral bores 40, the projections 52 extend to the V-shaped section 42 of the base body 14. As a result, the projections 52 are situated as close as possible to the axis 53 indicated with an X in FIG. 5.

The outer edge 54 of the projections 52 is rounded in order to engage in a corresponding opening between two teeth of a laterally engaging driving wheel, which deflects the conveyor chain in one plane, as explained above. The edge 56 of the projections 52, which extends from the rounded edge 54 to the V-shaped section 42, is preferably embodied as straight in this instance. The rounded edge 54 provides advantages with regard to the polygon effect in the above-mentioned deflection of the conveyor chain in one plane, since the teeth of the driving wheel can be designed a more favorable fashion. The convex or arc-shaped design of the surface of the projections 52 that engages in the gearing of the driving wheels has the advantage that during entry into the gearing of the driving wheels, it produces a linear contact zone and, with increasing rotation angle, produces a planar contact zone, thus permitting a significant reduction in surface pressure.

The projections 52 have an essentially uniform thickness, which is preferably greater than the diameter of the lateral bores 46 of the legs 44; in addition, the projections 52 have no openings. This reduces the stress concentration.

The chain link 10 has the advantage that the design of the projections 52, particularly with the introduction of force by means of a driving wheel that engages the projections 52, permits forces to be introduced in a favorable manner. Unfavorable moments, which could be produced in this connection, are reduced since the projections 52 are situated as close as possible to the horizontal axis 53 that extends perpendicular to longitudinal central axis 16 and through the center of gravity of the chain link 10. The conveyor chain comprised of a number of chain links 10 therefore operates smoothly. The conveyor chain is stable and is capable of transmitting powerful forces, yet is relatively light-weight.

What is claimed is:

1. A chain link (10), in particular of a curved conveyor chain having a carrying device (12) for holding transport material such as work pieces or work pieces supports; having a head part (24) disposed on the carrying device (12), with at least one lateral bore (40) for containing, particularly in a pivoting fashion, a pin (48) of a first chain link (10) adjacent to the head part (24); having a fork-shaped section (26), which adjoins the head part (24), is disposed on the carrying device (12), and has two legs (44), which encompass the head pan (24) of a second chain link (10) adjacent to the fork-shaped section (26) and contain lateral bores (46) that are aligned with each other; having a pin (48), which is contained in the lateral bores (46) of the legs (44) and in the head part (24) of the second adjacent chain link (10); and having projections (52) that protrude laterally from the legs (44), particularly intended for guiding the chain link (10) in the return side of a guide profile and for being driven by means of a driving wheel, characterized in that the protrusions (52) are disposed between the lateral bores (46) of the legs (44) and the at least one lateral bore (40) of the head part (24), viewed in the transport direction (33).

2. The chain link (10) according to claim 1, characterized in that the projections (52) are disposed at the same height as the longitudinal axes (40', 46') of the lateral bores (46) of the legs (44) and the at least one lateral bore (40) of the head part (24).

3. The chain link (10) according to claim 1, characterized in that the projections (52) are situated as close as possible to the axis (53), which extends perpendicular to the longitudinal central axis (16), parallel to the lateral bores (46) of the legs (44), and through the center of gravity of the chain link (10).

4. The chain link (10) according to claim 1, characterized in that the projections (52) directly adjoin the lateral bores (46) of the legs (44).

5. The chain link (10) according to claim 1, characterized in that the projections (52) extend along the longitudinal central axis (16) of the chain link (10) with a span dimensioned so that as little contact as possible occurs with the legs (44) of the first adjacent chain link (10) or at most, this occurs in a minimal turning radius in a type of deflection around a driving wheel in which the carrying devices (12) are moved in one plane.

6. The chain link (10) according to claim 1, characterized in that the span of the protrusions (52) along the longitudinal central axis (16) is dimensioned in such a way that starting from the lateral bore (46) of the leg (44), the projections (52) extend to a V-shaped section (42) of the base body (14) embodied between the head part (24) and the legs (44).

7. The chain link (10) according to claim 1, characterized in that the preferably uniform thickness of the protrusions (52) is greater than the diameter of the lateral bores (46) of the legs (44).

8. The chain link (10) according to claim 1, characterized in that a receptacle (50) for a threaded element, preferably a hex nut or hexagon bolt, is provided on the underside (22) of the carrying device (12), between the pin (48) and the head part (24), wherein material remains between the receptacle (50) and the side of the carrying device (12) against which the transport material rests.

9. The chain link (10) according to claim 1, characterized in that the outer edge (54) of the projections (52) is rounded in order to engage in a semicircular opening between two teeth of a driving wheel, which deflects a conveyor chain so that the carrying devices (12) are moved in one plane.

10. The chain link (10) according to claim 1, characterized in that the head part (24) contains a bore (30), that the bore (30) of the head part (24) supports a lug (32) with a lateral bore (38) in a rotating fashion, that two bores (40) are provided in the head part (24), which feed into the bore (30) of the head part (24) and widen toward the outside of the head part (24) so that the pin (48) of the first adjacent chain link (10) can pivot around the longitudinal axis (40') of the bore (30) of the head part (25), wherein the pin (48) is preferably supported in a rotating fashion in the lateral bore (38) of the lug (32) and is press-fitted into the lateral bores (46) of the legs (44), and wherein the lug (32) is preferably used for being driven by means of a driving wheel.

11. The chain link (10) according to claim 10, characterized in that the region (34) of the head part (24) on the underside of the chain link (10), which region 34 is at the front in the usual transport direction (33), and the region (36) of the lug (32) at the back in the usual transport direction (33) are rounded.

* * * * *